United States Patent
Sutherland

(10) Patent No.: US 12,061,573 B1
(45) Date of Patent: Aug. 13, 2024

(54) AUTOMATED DOCUMENT IMPORTING AND TAGGING PROCESSES AND SYSTEM FOR RECORDS RETENTION

(71) Applicant: Beverly Sutherland, Altadena, CA (US)

(72) Inventor: Beverly Sutherland, Altadena, CA (US)

(*) Notice: Subject to any disclaimer, the term of this patent is extended or adjusted under 35 U.S.C. 154(b) by 0 days.

(21) Appl. No.: 17/710,493

(22) Filed: Mar. 31, 2022

Related U.S. Application Data

(60) Provisional application No. 63/168,909, filed on Mar. 31, 2021.

(51) Int. Cl.
*G06F 16/16* (2019.01)
*G06F 16/14* (2019.01)

(52) U.S. Cl.
CPC ............ *G06F 16/16* (2019.01); *G06F 16/148* (2019.01)

(58) Field of Classification Search
CPC .............................. G06F 16/16; G06F 16/148
See application file for complete search history.

(56) References Cited

U.S. PATENT DOCUMENTS

| | | | | |
|---|---|---|---|---|
| 2011/0191343 A1* | 8/2011 | Heaton | ................... | G16Z 99/00 707/E17.046 |
| 2011/0307477 A1* | 12/2011 | Dasari | ................ | G06F 16/2457 707/723 |
| 2020/0125574 A1* | 4/2020 | Ghoshal | ............ | G06F 16/24573 |
| 2021/0240892 A1* | 8/2021 | Meinders | ................ | G06F 30/27 |

* cited by examiner

*Primary Examiner* — Mark D Featherstone
*Assistant Examiner* — Samuel C Sharpless, III
(74) *Attorney, Agent, or Firm* — STETINA BRUNDA GARRED & BRUCKER

(57) ABSTRACT

A records retention cloud application service and automated document importing and tagging system and the automated document importing and tagging processes for records retention are disclosed. The automation of the file importing and tagging enables faster centralization and management of large numbers of records.

10 Claims, 3 Drawing Sheets

AUTOMATED DOCUMENT IMPORTING AND TAGGING PROCESSES AND SYSTEM FOR RECORDS RETENTION

CLAIM OF BENEFIT TO PRIOR APPLICATION

This application claims benefit to U.S. Provisional Patent Application 63/168,909, entitled "A RECORDS RETENTION CLOUD APPLICATION SERVICE AND AN AUTOMATED DOCUMENT IMPORTING AND TAGGING SYSTEM," filed Mar. 31, 2021. The U.S. Provisional Patent Application 63/168,909 is incorporated herein by reference.

BACKGROUND

Embodiments of the invention described in this specification relate generally to records management systems, and more particularly, to a records retention cloud application service and an automated document importing and tagging system.

Many companies, organizations, and other entities retain records. However, the retention of such records is often made across multiple disparate locations, such as, cloud databases or cloud data storage from cloud providers (e.g., Google Drive, Microsoft One Drive, Dropbox, etc.), a local network accessible data storage, database, or hard drive, a government database or data storage location, open datasets, and any other data storage device or location, etc. This distribution of storage locations results in problems for companies in centralizing and archiving records residing in those multiple, different storage locations. This further fuels another problem as records are often needed for demonstrating compliance (by providing accurate records) and other matters. Most existing records storage systems or records retention systems used today are limited in that they do not facilitate record importing from multiple systems, especially cloud-based, government, open data systems, and other such data sources.

Therefore, what is needed is a way to automate file importing and tagging to provide faster centralization and management of large numbers of records.

BRIEF DESCRIPTION

A novel records retention cloud application service and automated document importing and tagging system and automated document importing and tagging processes for records retention are disclosed. In some embodiments, the records retention cloud application service and automated document importing and tagging system are configured to automatically import and tag files for records retention. In some embodiments, the records retention cloud application service and automated document importing and tagging system are configured for dataset discovery to categorization and tag files and records.

In some embodiments, the automated document importing and tagging processes for records retention comprise a dataset discovery process for matching file names and content with dataset classifications and tagging files. In some embodiments, the automated document importing and tagging processes for records retention comprise a records import process for automated categorization and tagging of files imported from user-specified data sources. In some embodiments, the automated document importing and tagging system hosts the records retention cloud application service for clients to connect to access software-implementations and user interface of the dataset discovery process and the records import process.

In some embodiments, the dataset discovery process for matching file names and content with dataset classifications and tagging files comprises (i) performing dataset discovery upon a user access trigger by a user, (ii) receiving user input of relevant categorization and tagging information, (iii) generating a discovered dataset list based using the relevant categorization and tagging information during dataset discovery, (iv) visually outputting the discovered dataset list, (v) receiving a particular dataset, (vi) receiving user input of a default number of categories associated with the particular dataset, (vii) auto generating record storage categories, (viii) receiving user selection of one or more categories up to the number of categories, (ix) receiving user input of a default number of tags, (x) auto generating the set of tags, and (xi) performing records import.

In some embodiments, the records import process for automated categorization and tagging of files imported from user-specified data sources comprises (i) performing records importation upon a user accessing an interface, (ii) receiving user input of a particular data storage location where data records are stored, (iii) performing authentication to access the particular data storage location, (iv) receiving a selection of particular data records to import, (v) importing the particular data records, (vi) performing category matching against the imported data records, (vii) performing tag matching against the imported data records, and (viii) importing, categorizing, and tagging any other data records from any other data storage location.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments.

Figure 1:
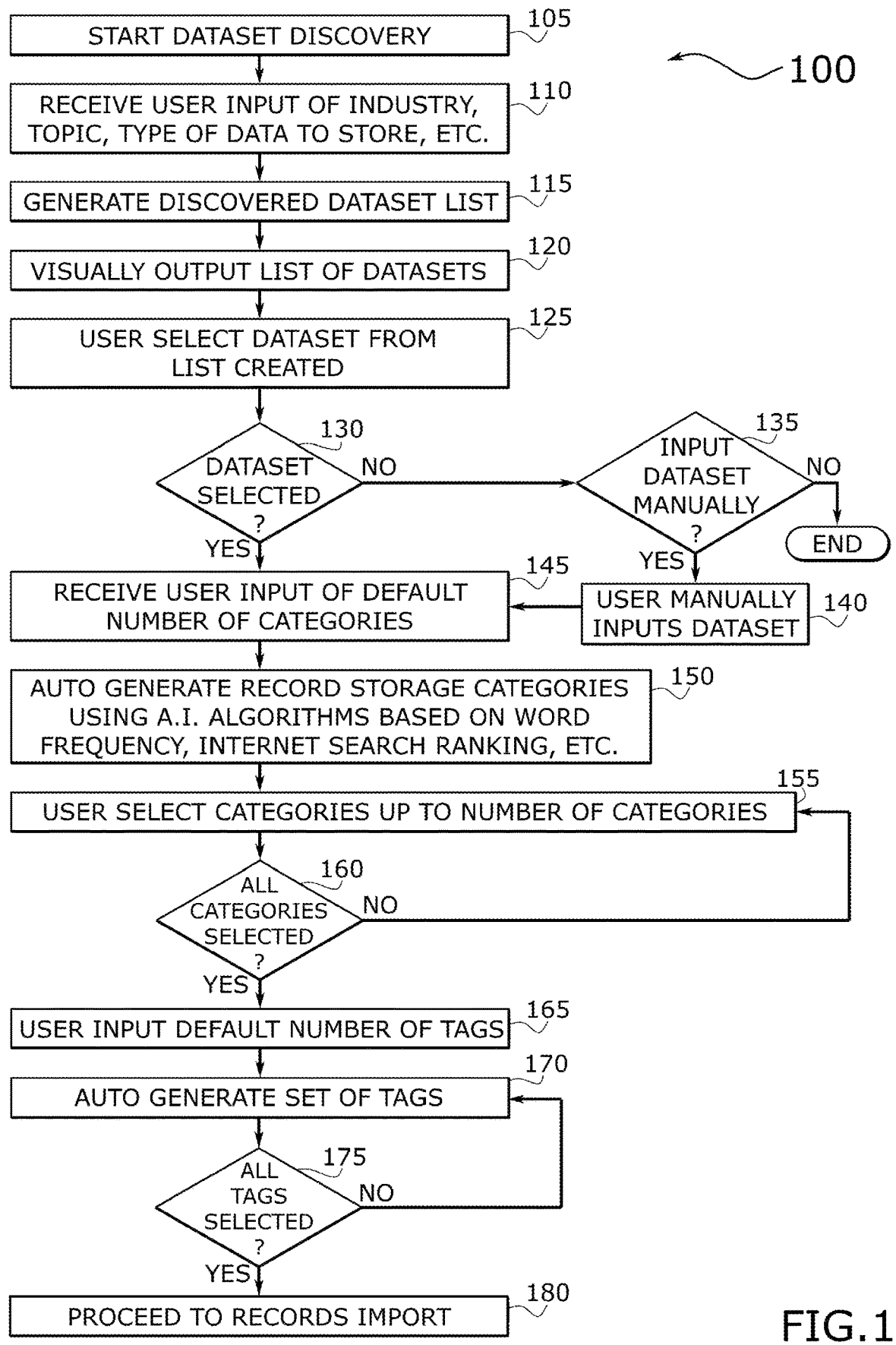

FIG. 1 conceptually illustrates a dataset discovery process for matching file names and content with dataset classifications and tagging files in some embodiments.

Figure 2:
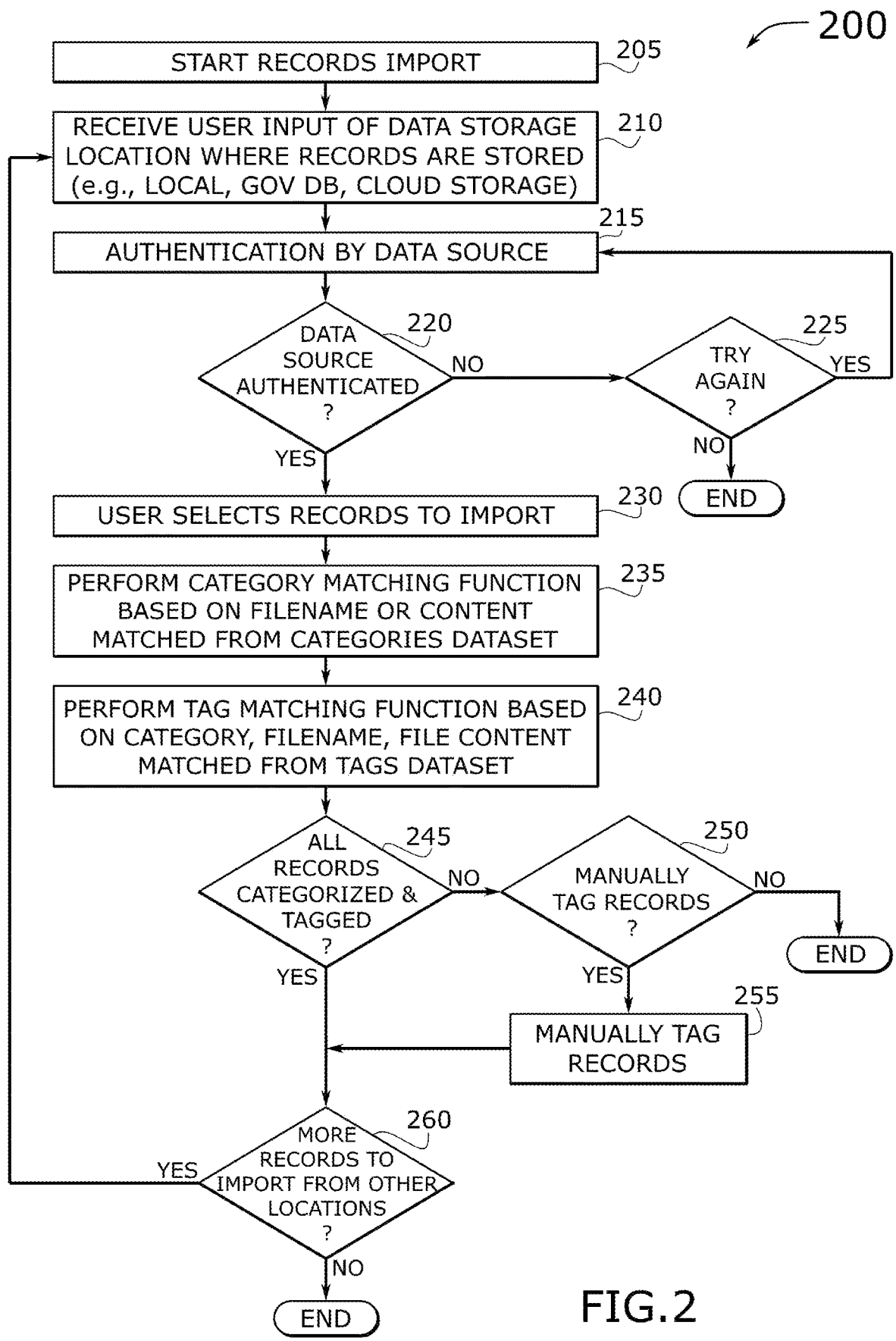

FIG. 2 conceptually illustrates a records import process for automated categorization and tagging of files imported from user-specified data sources in some embodiments.

Figure 3:
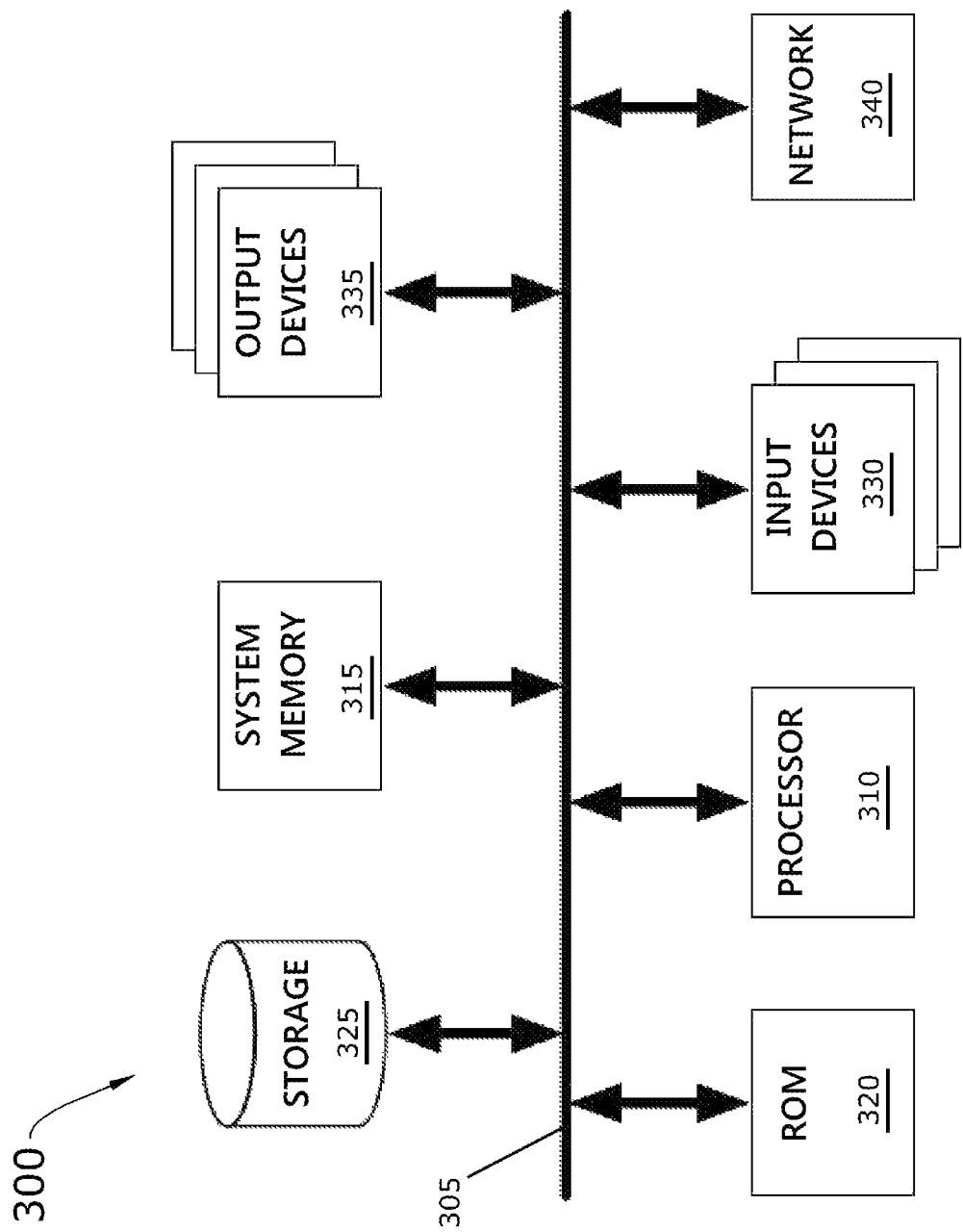

FIG. 3 conceptually illustrates conceptually illustrates an electronic system with which some embodiments of the invention are implemented.

DETAILED DESCRIPTION

In the following detailed description of the invention, numerous details, examples, and embodiments of the invention are described. In this specification, the terms "classification" and "categorization" and their respective corollaries, are used interchangeably and functionally have the same meaning. Also, the terms "data", "records", "reports", "information", and the like, are used interchangeably in this disclosure and, therefore, when a particular term is used in absence of another term or terms (e.g., " . . . importing data"versus" . . . importing records"versus" . . . importing data, records, or data/records, reports, and/or other information"), it is understood that the same meaning is applied as they relate to the various aspects of the different embodiments described in this specification. Also, it will be clear and apparent to one skilled in the art that the invention is not limited to the embodiments set forth and that the invention can be adapted for any of several applications.

Some embodiments provide a records retention cloud application service and automated document importing and tagging system and automated document importing and tagging processes for records retention are disclosed. In some embodiments, the records retention cloud application service and automated document importing and tagging system are configured to automatically import and tag files for records retention. In some embodiments, the records retention cloud application service and automated document importing and tagging system are configured for dataset discovery to categorization and tag files and records.

In some embodiments, the automated document importing and tagging processes for records retention comprise a dataset discovery process for matching file names and content with dataset classifications and tagging files. In some embodiments, the automated document importing and tagging processes for records retention comprise a records import process for automated categorization and tagging of files imported from user-specified data sources. Examples of data sources include, without limitation, cloud database storage (e.g., Google Drive, Microsoft One Drive, Dropbox, etc.), a local network accessible data storage, database, or hard drive, a government database or data storage location, open datasets, and any other data storage device or location that provides an application programming interface (API) through which automated connection, authentication, and data record or file/record retrieval is possible and enabled. In some embodiments, the automated document importing and tagging system hosts the records retention cloud application service for clients to connect to access software-implementations and user interface of the dataset discovery process and the records import process.

As stated above, many companies, organizations, and other entities retain records. However, the retention of such records is often made across multiple disparate data storage devices and/or locations, such as, cloud data storage (e.g., Google Drive, Dropbox, Microsoft One Drive, etc.), open data or open datasets from any location (local, network accessible, government, cloud-based, etc.), hard drives and other physical storage media (locally or network-accessible), etc. This represents a wide range of storage locations which results in problems for companies who wish to centralize and archive files, records, data sets, etc., residing in those multiple, different storage locations. This further fuels another problem as records, files, data, etc., are often needed for compliance and other matters. Most existing records storage systems are limited in that they do not facilitate record importing from multiple systems. Companies, organizations, and even individual users who rely on multiple and varied data storage devices and/or locations, therefore, encounter these problems when intending to maintain consistency in compliance records or other data needs since importing is typically not tied to the existing records storage system in any way. Embodiments of the records retention cloud application service and automated document importing and tagging system and the automated document importing and tagging processes for records retention described in this specification solve such problems by of API-enabled, automated software-implemented processes for performing dataset discovery and automatically importing data and records from user-specified locations and, through artificial intelligence ("A.I." or "AI") and machine learning ("M.L." or "ML") modules that integrate into and inform custom search and matching algorithms, enable automatic identification of file/record content when classifications do not match with file names, thereby enabling tagging of such files and records upon import.

Embodiments of the records retention cloud application service and automated document importing and tagging system and the automated document importing and tagging processes for records retention described in this specification differ from and improve upon currently existing options. In particular, the software system is better than what exists in the field because of the automated importing and tagging.

In addition, these embodiments improve upon the currently existing systems which do not address the issue of handling the import of large numbers of records. By contrast, the automation of the file importing and tagging provided by the records retention cloud application service and automated document importing and tagging system and the automated document importing and tagging processes for records retention of the present disclosure enables faster centralization and management of large numbers of records. Additionally, the records retention cloud application service and automated document importing and tagging system and the automated document importing and tagging processes for records retention can be adapted for use in other industries that require automated classification and tagging, including, without limitation, manufacturing, inventory management, etc.

The records retention cloud application service and automated document importing and tagging system and the automated document importing and tagging processes for records retention of the present disclosure may be comprised of the following elements and steps. This list of possible constituent elements and steps is intended to be exemplary only and it is not intended that this list be used to limit the records retention cloud application service and automated document importing and tagging system and the automated document importing and tagging processes for records retention of the present application to just these elements or just these steps. Persons having ordinary skill in the art relevant to the present disclosure may understand there to be equivalent elements or steps that may be substituted within the present disclosure without changing the essential function or operation of the records retention cloud application service and automated document importing and tagging system or the automated document importing and tagging processes for records retention.

1. Connect to the records retention cloud application service (hosted by the automated document importing and tagging system) site by a user computing device
2. Login as required
3. Select autosync interface to initiate automated synchronization of records import from user-specified data source(s)
4. Connect to data sources through API (Google Drive, Dropbox, Microsoft One Drive, a government database or data storage location, open datasets, local drive, etc.)

5. Import file or multiple files
6. Load dataset of file classifications
7. Match content classification based on dataset
8. Tag files The various elements and steps of the records retention cloud application service and automated document importing and tagging system and the automated document importing and tagging processes for records retention of the present disclosure may be related in the following exemplary fashion. It is not intended to limit the scope or nature of the relationships between the various elements/steps and the following examples are presented as illustrative examples only. Step 1 is for connecting to the service. Step 2 is the login requirement (if needed). Then Step 3 initiates the process for records import as specified in the next step. Step 4 is selection and connection to one or more data source(s). Records and files selected in Step 4 are imported in Step 5. The dataset of file classifications are loaded or referenced (if already loaded) in Step 6. During Step 7, an algorithm runs to determine matches of records from Step 5 and the dataset loaded/referenced in Step 6. Then Step 8 tags each file according to its classification dataset.

The records retention cloud application service and automated document importing and tagging system and the automated document importing and tagging processes for records retention of the present disclosure generally works by enabling automated file import and tagging from multiple locations including, without limitation, cloud database storage providers (e.g., Google Drive, Microsoft One Drive, Dropbox, etc.), a local network accessible data storage, database, or hard drive, a government database or data storage location, open datasets, and any other data storage device or location that provides an application programming interface (API). When an imported record filename does not match the classification dataset, the process continues with searching file content for a classification match.

To make the records retention cloud application service and automated document importing and tagging system and the automated document importing and tagging processes for records retention of the present disclosure, a developer may create a classification dataset, an API for interfacing to storage locations, develop a search and match algorithm, implement code for tagging, and the user interface, and build the software that runs by the records retention cloud application service and automated document importing and tagging system and the automated document importing and tagging processes for records retention. In some embodiments, the records retention cloud application service and automated document importing and tagging system and the automated document importing and tagging processes for records retention includes an AI engine to automate the creation of the classification and tagging datasets. In some embodiments, the records retention cloud application service and automated document importing and tagging system and the automated document importing and tagging processes for records retention includes more advanced algorithms for reading file scanned date, images, or distorted content. In some embodiments, the algorithm for determining the classification match can be reconfigured such that classification match can be done based on file content first, then name or perhaps the filename search can be completely eliminated.

To use the records retention cloud application service and automated document importing and tagging system and the automated document importing and tagging processes for records retention of the present disclosure, a user starts the may start the software or connects to the records retention cloud application service (by a computing device that has access to the network). The user performs login and authentication as required. Starting at this point, the user selects the autosync interface to initiate automated synchronization of records import from user-specified data source(s). In essence, this will allow the user to aggregate and centralize large numbers of files automatically by connecting to data sources through API interfaces. For example, the user may specify a Google Drive location for some files, another cloud database (e.g., Dropbox or Microsoft One Drive) for another set of files, a government database or data storage location, an open dataset that is continually added to or updated, a local drive, etc. Based on user selection of one or more file(s) or data set(s), the importing starts. Then the dataset of file classifications is loaded (or just accessed if already loaded into memory). File names are matched based on classifications selected. Whenever filename matching does not yield a result, content matching is performed from content in the file. The categorized files are the tagged. This process continues automatically for the noted data sources, but can be updated as needed (e.g., different or new classifications per source, different or new locations from which to import records, etc.).

In some embodiments, the dataset discovery process for matching file names and content with dataset classifications and tagging files comprises (i) performing dataset discovery upon a user access trigger by a user, (ii) receiving user input of relevant categorization and tagging information, (iii) generating a discovered dataset list based using the relevant categorization and tagging information during dataset discovery, (iv) visually outputting the discovered dataset list, (v) receiving a particular dataset, (vi) receiving user input of a default number of categories associated with the particular dataset, (vii) auto generating record storage categories, (viii) receiving user selection of one or more categories up to the number of categories, (ix) receiving user input of a default number of tags, (x) auto generating the set of tags, and (xi) performing records import. In some embodiments, the user access trigger comprises the user connecting to a records retention cloud application service hosted by an automated document importing and tagging system. In some embodiments, the relevant categorization and tagging information comprises at least one of an industry, a topic, and a type of data to store. In some embodiments, the discovered dataset list is visually output to an interface viewable by the user after the user connects to the records retention cloud application service. In some embodiments, receiving the particular dataset comprises receiving a selection from the discovered dataset list of a dataset list entry corresponding to the particular dataset. In some embodiments, receiving the particular dataset comprises receiving manual input, from the user, of the particular dataset. In some embodiments, the default number of categories is used to generate record storage categories for record import of data records. In some embodiments, auto generating record storage categories comprises using A.I. modules that implement A.I. algorithms and perform A.I. processing based on at least one of word frequency and internet search ranking.

By way of example, FIG. 1 conceptually illustrates a dataset discovery process for matching file names and content with dataset classifications and tagging files 100 in some embodiments. As shown in this figure, the dataset discovery process for matching file names and content with dataset classifications and tagging files 100 starts with dataset discovery (at 105) when the user connects to the records retention cloud application service or otherwise starts/accesses the software. For instance, the user may connect to the records retention cloud application service hosted by the automated document importing and tagging system and select a dataset discovery interface. In some embodiments, the interface provides a way for the user to interact with, configure, view lists, input categories information or numbers, select locations, etc.

In some embodiments, the dataset discovery process for matching file names and content with dataset classifications and tagging files 100 moves ahead to the next step of receiving user input of an industry, topic, type of data to store, and/or other relevant information that may be suitable for a company, corporation, business, organization, etc., or which may connect the data content of the files with certain relevant external information (at 110). For example, inputting or selecting an industry (name) to relate to data records needed for demonstrating a company's compliance with the rules and regulations for that industry. Other such information as input or selected by the user for data records that relate to a topic or specific event such as data related to departmental research on and costs for a project, the type of data to store (e.g., tab-delimited data from spreadsheets, comma-delimited data from other spreadsheets, alpha-numeric textual data for documents, reports, data readings, and any other such number and text-based informational records, image data as visual documents supporting other data records, etc.), or other such information, input, data types, and/or record types.

Next, the dataset discovery process for matching file names and content with dataset classifications and tagging files 100 of some embodiments generates a discovered dataset list (at 115). In some embodiments, dataset discovery may be performed when one or more existing datasets have already been created in the system. In some embodiments, the datasets that are discovered are based on the user input of industry, topic, type of data to store, etc. Upon completion of dataset discovery based on this user input (that is, the user input for industry, topic, type of data to store, etc.), the search results from performing dataset discovery are returned. In some embodiments, the returned search results are automatically read, thereby allowing the dataset discovery process for matching file names and content with dataset classifications and tagging files 100 to generate a list of the discovered datasets (referred to as the "discovered dataset list").

After generating the discovered dataset list (at 115), the dataset discovery process for matching file names and content with dataset classifications and tagging files 100 of some embodiments proceeds to a step for visually outputting (or displaying) the discovered dataset list (at 120). In some embodiments the dataset discovery process for matching file names and content with dataset classifications and tagging files 100 visually outputs the discovered dataset list (at 120) to the interface viewable by the user after the user connects to the records retention cloud application service.

After displaying the discovered dataset list (at 120) in the interface for user to view (or other location from which the user may view the discovered dataset list), the dataset discovery process for matching file names and content with dataset classifications and tagging files 100 continues to the next step during which the user may select a dataset from the discovered dataset list (at 125). Next, the dataset discovery process for matching file names and content with dataset classifications and tagging files 100 of some embodiments determines (at 130) whether the user has selected a dataset or not.

In some embodiments, when a dataset has been determined (at 130) to have been selected by the user ('YES'), the dataset discovery process for matching file names and content with dataset classifications and tagging files 100 transitions to a step for receiving user input of a default number of categories (at 145). The user input of the default number of categories is important for subsequent steps of generating record storage categories for record import of data records. The step for receiving user input of the default number of categories (at 145) is described further below.

Referring back to the determination (at 130) of whether the user has selected a dataset or not, when no dataset has been selected, the dataset discovery process for matching file names and content with dataset classifications and tagging files 100 of some embodiments performs a couple of additional steps before (or even whether to continue with) proceeding to the step for receiving user input of a default number of categories (at 145). Specifically, the dataset discovery process for matching file names and content with dataset classifications and tagging files 100 of some embodiments determines (at 135) whether the user will input a dataset manually or not. For example, if the discovered dataset list yields a set of search results that are not sufficiently related to the data categorization and tagging needs the user anticipates for a set of data records to import from an external (that is, outside the records retention system, e.g., a cloud-based data source or other data source, even a local hard drive or open data set) data source, then the user may wish to data the dataset information before proceeding. Therefore, referring back to the determination (at 135), when the user affirmatively does want to manually input a dataset, the dataset discovery process for matching file names and content with dataset classifications and tagging files 100 of some embodiments proceeds to the next step during which the user manually inputs the dataset (at 140). Then the dataset discovery process for matching file names and content with dataset classifications and tagging files 100 proceeds to the step for receiving user input of the default number of categories (at 145), as mentioned above. On the other hand, when it is determined (at 135) that the user does not intend to manually input a dataset, then the dataset discovery process for matching file names and content with dataset classifications and tagging files 100 of some embodiments ends.

Turning back to the step for receiving user input of the default number of categories (at 145), at this point in the dataset discovery process for matching file names and content with dataset classifications and tagging files 100, the user may be prompted to input any positive integer value for the default number of categories. In some embodiments, the dataset discovery process for matching file names and content with dataset classifications and tagging files 100 may provide a range of integer values that are acceptable as input for the default number of categories. For instance, a range of integer values from one through twenty, inclusive (i.e., 1-20), any of which, when input by the user, is deemed acceptable for the default number of categories. However, if the user attempts to input a value that is not suitable (e.g., a floating point value, an imaginary number, zero, a negative integer value, an integer value that exceeds the highest allowable value, an expression, a formula, etc.), then the dataset discovery process for matching file names and content with dataset classifications and tagging files 100 may notify the user (via the interface) of the acceptable range of values (that is, if there actually is a range of values with an uppermost or highest value) from which to choose or input, and then proceed to prompt the user again to input the default number of categories (at 145).

In some embodiments, after receiving the user input of the default number of categories (at 145), the dataset discovery process for matching file names and content with dataset classifications and tagging files 100 proceeds to auto generate record storage categories (at 150) using the A.I. modules (that implement A.I. algorithms). In some embodiments, the dataset discovery process for matching file names and content with dataset classifications and tagging files 100 uses the A.I. to auto generate the record storage categories (at 150) based on one or more factors, such as word frequency, internet search ranking, etc.

After generating record storage categories for record import of data records, the dataset discovery process for matching file names and content with dataset classifications and tagging files 100 of some embodiments continues to the next step during which the user selects categories (at 155) up to (but not exceeding) the number of categories. Then the dataset discovery process for matching file names and content with dataset classifications and tagging files 100 of some embodiments determines (at 160) whether the user has selected all categories or not. When the user has not selected all categories ('NO'), the dataset discovery process for matching file names and content with dataset classifications and tagging files 100 of some embodiments returns to the step at which the user selects the categories up to the number of categories (at 155). In some embodiments, the user is prompted to select another category each time until selecting an option to end the selection of categories. In this way, the user may select one or more categories without exceeding the total number of categories.

On the other hand, when it is determined (at 160) that the user has affirmatively ('YES') selected all the categories needed (at this point, at least), then the dataset discovery process for matching file names and content with dataset classifications and tagging files 100 of some embodiments receives user input of a default number of tags (at 165). In some embodiments, the user inputs the default number of tags (at 165) when prompted to do so in the interface. The default number of tags, like the default number of categories, may be constrained by a range of acceptable positive integer values (e.g., 1-50 tags). Based on the user input, the tag data is ready as value data (beyond merely the number of tags).

In some embodiments, the dataset discovery process for matching file names and content with dataset classifications and tagging files 100 then auto generates the set of tags (at 170). In some embodiments, the dataset discovery process for matching file names and content with dataset classifications and tagging files 100 determines (at 175) whether all tags have been selected for auto generation. When not all tags have been selected ('NO'), the dataset discovery process for matching file names and content with dataset classifications and tagging files 100 of some embodiments returns back to the step for auto generating the set of tags (at 170) to add more. However, when all tags have affirmatively been selected ('YES'), the dataset discovery process for matching file names and content with dataset classifications and tagging files 100 of some embodiments proceeds onward to the records importation (at 180) stage. While in some embodiments, the dataset discovery process for matching file names and content with dataset classifications and tagging files 100 may end, instead of proceeding to the records import stage (at 180), a person skilled in the relevant art would appreciate that the user could re-initiate this process to continue onto the records import stage, or may simply launch at a point of records import, which is described further below.

In some embodiments, the records import process for automated categorization and tagging of files imported from user-specified data sources comprises (i) performing records importation upon a user accessing an interface, (ii) receiving user input of a particular data storage location where data records are stored, (iii) performing authentication to access the particular data storage location, (iv) receiving a selection of particular data records to import, (v) importing the particular data records, (vi) performing category matching against the imported data records, (vii) performing tag matching against the imported data records, and (viii) importing, categorizing, and tagging any other data records from any other data storage location. In some embodiments, the particular data records comprise user-specified data records from the particular data storage location. In some embodiments, the records import process performs category matching by way of a category matching function. In some embodiments, the category matching function compares the imported data records to a categories dataset to see if there is a match. In some embodiments, the category matching function compares and checks for a match based on a filename of each file among the imported data records and, when there is no filename match, content in each file among the imported data records. In some embodiments, performing tag matching comprises performing a tag matching function by comparing one or more of a category, a filename, and file content of each file among the imported data records to a tags dataset to see if there is a match.

By way of example, FIG. 2 conceptually illustrates a records import process for automated categorization and tagging of files imported from user-specified data sources 200 in some embodiments. The records import process for automated categorization and tagging of files imported from user-specified data sources 200 of some embodiments starts with records import (at 205). Records import includes the data, records, data sets, information, reports, images, or any other relevant data that can be stored in any of several locations. Examples of the locations in which the data records may be stored include, without limitation, cloud database storage (e.g., Google Drive, Microsoft One Drive, Dropbox, etc.), a local network accessible data storage, database, or hard drive, a government database or data storage location, open datasets, and any other data storage device or location that provides an application programming interface (API).

In some embodiments, the records import process for automated categorization and tagging of files imported from user-specified data sources 200 receives user input of a particular data storage location where the records are stored (at 210). In some embodiments, the user specifies the data storage location via an interface when connected to the service. The user may have several data storage locations from which he or she wishes to import records, but the records import process for automated categorization and tagging of files imported from user-specified data sources 200 described in this specification handles each particular data storage location one-by-one. For example, the user may have some data records storage locally on a hard drive accessible via a local area network (LAN) or in a multi-city or country corporation, via a wide area network (WAN), with the encryption and data security expected within the organization (thus, requiring some level of user authentication to access). Alternatively, the data records may be stored in the cloud (that is, at an Internet provider location, such as Dropbox, Google Drive, etc., or piecemeal storage in the cloud, such as attachment to emails, storage in applications that are cloud-based, such as CRM systems that are not entirely connected or integrated with the corporate/organization records retention system). Those records may also require user authentication, or may be open data sets (no authentication and unencrypted), or any variety of data security/user authentication and data encryption as possible.

In some embodiments, the records import process for automated categorization and tagging of files imported from user-specified data sources 200 proceeds to the next step for authentication by the data source (at 215). In some embodiments, after the user inputs the particular data source location, the interface may prompt the user to enter username/password login credentials, or other authentication credentials as required by the data source provider associated with the particular data storage location. In this way, the records import process for automated categorization and tagging of files imported from user-specified data sources 200 can pass the user credentials to the data source provider for authentication of the user, thereby allowing access to the data records stored in the user specified particular data storage location.

In some embodiments, the records import process for automated categorization and tagging of files imported from user-specified data sources 200 then determines (at 220) whether the user credentials worked for the data source provider to authenticate the user and thereby allow the data records to the accessed from the particular data storage location. When authentication to the particular data storage location succeeds ('YES'), the records import process for automated categorization and tagging of files imported from user-specified data sources 200 of some embodiments proceeds to a step during which the user selects the data records to import (at 230) and then proceeds to steps for category and tag matching against the imported data records. The user selects the data records from the particular data storage location, which may be presented visually to the user as a list of files stored in the particular data storage location or as a several selectable file icons represented the stored data records/files in the particular data storage location. The steps for category and tag matching against the imported data records are further described below.

Turning back to the determination (at 220), when authentication to the particular data storage location fails ('NO'), the records import process for automated categorization and tagging of files imported from user-specified data sources 200 of some embodiments proceeds along a different route to a step for determining (at 225) whether to try user authentication to the particular data storage location again or not. When trying authentication of the user again is not ('NO') determined (at 225), the records import process for automated categorization and tagging of files imported from user-specified data sources 200 ends. However, when trying to authenticate the user at the particular data storage location again is affirmatively ('YES') determined (at 225), the records import process for automated categorization and tagging of files imported from user-specified data sources 200 of some embodiments transitions back to the step for authentication by the data source (at 215). In some embodiments, this may involve prompting the user to re-enter the login credentials for accessing the particular data storage location, and may even involve a two-step authentication step in which the records import process for automated categorization and tagging of files imported from user-specified data sources 200 waits for a code to be input by the user after the data source provider verifies the username/password of the user at a first authentication stage, followed by sending a unique code to a phone number of the user or through an app to the user, etc. Then, when/if the user enters the code as the second authentication criteria for the two-factor authentication, the records import process for automated categorization and tagging of files imported from user-specified data sources 200 of some embodiments merely passes the input code on to the data source provider for validation of the code at the second authentication stage. In this way, the records import process for automated categorization and tagging of files imported from user-specified data sources 200 supports two-factor or many-factor authentication at any of several external data source providers associated with any of several data storage locations that may be input by the user for records importing. Also, the records import process for automated categorization and tagging of files imported from user-specified data sources 200 of some embodiments continues to cycle through the authentication as needed or until the data source provider associated with the particular data storage location (temporarily or otherwise) blocks further attempts to authentication by the user.

Now, turning back to the step during which the user selects the data records to import (at 230), which are subsequently imported after which the records import process for automated categorization and tagging of files imported from user-specified data sources 200 proceeds to steps for category and tag matching against the imported data records. Specifically, the records import process for automated categorization and tagging of files imported from user-specified data sources 200 of some embodiments proceeds to a step for performing a category matching function (at 235) based on the filename of each file among the user-selected records to import or based on content in each file among the user-selected records to import (when the filename matching is not successful). Specifically, the category matching function of some embodiments compares the filename or file content of each file among the user-selected imported records to a categories dataset to see if there is a match.

In some embodiments, the records import process for automated categorization and tagging of files imported from user-specified data sources 200 then performs a tag matching function (at 240) based on the category, filename, and file content. Specifically, the tag matching function of some embodiments compares the category, filename, and file content of each file among the user-selected imported records to a tags dataset to see if there is a match.

After performing category matching and tag matching for each file (among potentially many files of the user-selected imported records), the records import process for automated categorization and tagging of files imported from user-specified data sources 200 determines (at 245) whether all records (among the imported records selected by the user for importing from the particular data storage location) have been categorized and tagged.

When all records have been affirmatively categorized and tagged ('YES'), the records import process for automated categorization and tagging of files imported from user-specified data sources 200 proceeds ahead to a step for determining (at 260) whether there are more data records to import from other data storage locations or not. This would be the case if the user has other locations from which to import records. The step for determining (at 260) whether the user has more data records to import from other data storage locations and subsequent steps are described further below.

On the other hand, when it is determined (at 245) that not all records have been categorized and tagged ('NO'), the records import process for automated categorization and tagging of files imported from user-specified data sources 200 of some embodiments transitions to another step for determining (at 250) whether to manually tag the records or not. When manually tagging the records is determined (at 250) to be the affirmative ('YES') course of action, then the user manually tags those records (at 255) and the records import process for automated categorization and tagging of files imported from user-specified data sources 200 continues ahead to the step mentioned above for determining (at 260) whether there are more data records to import from other data storage locations or not. However, when manually tagging the records is not ('NO') determined (at 250) to be happening by the user, then the records import process for automated categorization and tagging of files imported from user-specified data sources 200 ends.

Turning back to the determination (at 260) of whether there are more data records the user would like to import from other data storage locations: when there are more data storage locations from which to import data records ('YES'), the records import process for automated categorization and tagging of files imported from user-specified data sources 200 of some embodiments transitions back to the step for receiving (at 210) user input of another (different) data storage location from where the data records can be imported into the records retention system. Note that this other (different) data storage location can be a different location associated with a different data source provider or the other (different) data storage location can be a different location within the same data source provider as previously accessed for the first set of data records imported. When the same data source provider is accessed as the previous data source provider for the previous records import, but the records are simply in a different storage location within the (same) data source provider, then the user authentication by the data source step (at 215) may be skipped, so long as the data source provider does not require the user to authenticate again. On the other hand, if the other (different) data storage location is accessed at a different data source provider than the data source provider from the previous data records import, then the step for authentication by the data source (at 215) is triggered and the user will input the user credentials when prompted or otherwise notified of the authentication requirement (whether two-factor authentication or another authentication scheme). This is the logical outcome in the practical case since the user may have different login credentials for accessing two different data source providers. However, the user may employ a password manager-type application that obviates the need for the user to manually input user credentials or any unique codes, etc., since a password manager can be configured to catch the event prompting the user for the login credentials, and supply the corresponding user credentials (in encrypted and secure format, thereby ensuring username/password or other login credentials integrity and security).

In some embodiments, the records import process for automated categorization and tagging of files imported from user-specified data sources 200 continues this cycle for any and all data storage locations from which the user intends to import data records into the records retention system. When the user has not more data storage locations from which to import further data records, the records import process for automated categorization and tagging of files imported from user-specified data sources 200 ends.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 3 conceptually illustrates an electronic system 300 with which some embodiments of the invention are implemented. The electronic system 300 may be a computing device (such as a desktop computer, a single board computer (SBC), a laptop, a server computer system, a database management system and server, etc.), a mobile device (such as a phone, cell phone, mobile phone, smartphone, tablet computing device, personal digital assistive (PDA) device, another handheld computing device, etc.), or any other sort of electronic device or computing device. Such an electronic system includes various types of computer readable media and interfaces for various other types of computer readable media. Electronic system 300 includes a bus 305, processing unit(s) 310, a system memory 315, a read-only memory 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive, or a solid state drive integrated at a kernel/hardware device interface level of the electronic system 300) as the permanent storage device 325.

Other embodiments use a removable storage device (such as a floppy disk or a flash drive) as the permanent storage device 325. Like the permanent storage device 325, the system memory 315 is a read-and-write memory device.

However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only memory 320. For example, the various memory units include instructions for importing data records from user-specified data storage locations and may include instructions for verifying identity of users or otherwise authenticating users, presenting user interfaces (UIs) and visual information in one or more UIs, instructions for matching according to categories or classifications based on filenames, stubs of filenames, and/or content in files or data records, instructions for tagging files and/or data records on import after retrieval, etc., in accordance with some embodiments. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as liquid crystal displays (LCD) and organic light emitting diode (OLED) displays. Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an intranet), or a network of networks (such as the Internet). Any or all components of electronic system 300 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, machine-readable storage media, non-transitory computer readable media, etc.). Some examples of such computer-readable media include RAM, ROM, disc media (CDs, DVDs, Blu-Ray® discs, ultra density optical discs, etc.), flash memory (e.g., SD cards, mini-SD cards, micro-SD cards, etc.), magnetic and/or solid state hard drives, or any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 and 2 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process that combines the processes of both FIGS. 1 and 2 together. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a computing device, matches file names and content with dataset classifications and tagging files and automatically categorizes and tags data records imported from a data source location, said program comprising sets of instructions for:
    performing dataset discovery upon a user access trigger by a user;
    receiving user input of relevant categorization and tagging information;
    generating a discovered dataset list based using the relevant categorization and tagging information during dataset discovery;
    visually outputting the discovered dataset list;
    receiving a particular dataset from among the discovered dataset list;
    receiving user input of a default number of categories associated with the particular dataset, wherein the default number of categories is used to generate record storage categories for record import of data records;
    auto generating record storage categories using A.I. modules that implement A.I. algorithms and perform A.I. processing based on at least one of word frequency and internet search ranking;
    receiving user selection of one or more categories from among the auto generated record storage categories;
    receiving user input of a default number of tags;
    auto generating a set of tags;
    receiving user input of a particular data storage location in which data records are stored;
    performing authentication to access the particular data storage location;
    receiving selection of particular data records to import from the particular data storage location;
    importing the particular data records;
    performing category matching against the imported data records, wherein the category matching function compares the imported data records to the selected one or more categories associated with the particular dataset to see if there is a match; and
    performing tag matching against the imported data records, wherein the tag matching function compares one or more of a category, a filename, and a file content of each file among the imported data records to a tags dataset including the auto generated set of tags to determine a match.

2. The non-transitory computer readable medium of claim 1, wherein the user access trigger comprises the user connecting to a records retention cloud application service hosted by an automated document importing and tagging system.

3. The non-transitory computer readable medium of claim 2, wherein the discovered dataset list is visually output to an interface viewable by the user after the user connects to the records retention cloud application service.

4. The non-transitory computer readable medium of claim 1, wherein the relevant categorization and tagging information comprises at least one of an industry, a topic, and a type of data to store.

5. The non-transitory computer readable medium of claim 1, wherein the set of instructions for receiving the particular dataset comprises a set of instructions for receiving a selection from the discovered dataset list of a dataset list entry corresponding to the particular dataset.

6. The non-transitory computer readable medium of claim 1, wherein the set of instructions for receiving the particular dataset comprises a set of instructions for receiving manual input, from the user, of the particular dataset.

7. The non-transitory computer readable medium of claim 1, wherein the set of instructions for performing category matching comprises a set of instruction for performing a category matching function based on one of (i) a filename of each file among the imported data records and (ii) content in each file among the imported data records when the filename does not match.

8. The non-transitory computer readable medium of claim 1, wherein the program further comprises a set of instruction for determining whether any other data records stored in any other data storage location are intended by the user for importing, categorizing, and tagging.

9. A method of matching file names and content with dataset classifications and tagging files and automatically categorizing and tagging data records imported from a data source location, the method comprising:
- performing dataset discovery upon a user access trigger by a user;
- receiving user input of relevant categorization and tagging information;
- generating a discovered dataset list based using the relevant categorization and tagging information during dataset discovery;
- visually outputting the discovered dataset list;
- receiving a particular dataset from among the discovered dataset list;
- receiving user input of a default number of categories associated with the particular dataset, wherein the default number of categories is used to generate record storage categories for record import of data records;
- auto generating record storage categories using A.I. modules that implement A.I. algorithms and perform A.I. processing based on at least one of word frequency and internet search ranking;
- receiving user selection of one or more categories from among the auto generated record storage categories;
- receiving user input of a default number of tags;
- auto generating a set of tags;
- receiving user input of a particular data storage location in which data records are stored;
- performing authentication to access the particular data storage location;
- receiving selection of particular data records to import from the particular data storage location;
- importing the particular data records;
- performing category matching against the imported data records, wherein the category matching function compares the imported data records to the selected one or more categories associated with the particular dataset to see if there is a match; and
- performing tag matching against the imported data records, wherein the tag matching function compares one or more of a category, a filename, and a file content of each file among the imported data records to a tags dataset including the auto generated set of tags to determine a match.

10. A system for matching file names and content with dataset classifications and tagging files and automatically categorizing and tagging data records imported from a data source location, the system comprising:
- one or more input devices operable to receive a user access trigger and user input of relevant categorization and tagging information;
- one or more processors operable to perform dataset discovery upon the user access trigger, the one or more processors generating a discovered dataset list based using the relevant categorization and tagging information during dataset discovery; and
- one or more output devices operable to visually output the discovered dataset list;
- wherein the one or more processors is further operable to receive a particular dataset from among the discovered dataset list and the one or more input devices is further operable to receive user input of a default number of categories associated with the particular dataset, the default number of categories being used to generate record storage categories for record import of data records;
- wherein the one or more processors is further operable to auto generate record storage categories using A.I. modules that implement A.I. algorithms and perform A.I. processing based on at least one of word frequency and internet search ranking, the one or more input devices is further operable to receive user selection of one or more categories from among the auto generated record storage categories and receive user input of a default number of tags, and the one or more processors is further operable to auto generate a set of tags;
- wherein the one or more input devices is further operable to receive user input of a particular data storage location in which data records are stored, and the one or more processors is further operable to perform authentication to access the particular data storage location;
- wherein the one or more input devices is further operable to receive selection of particular data records to import from the particular data storage location, and the one or more processors is further operable to import the particular data records and perform category matching and tag matching against the imported data records, the category matching function comparing the imported data records to the selected one or more categories associated with the particular dataset to see if there is a match, the tag matching function comparing one or more of a category, a filename, and a file content of each file among the imported data records to a tags dataset including with the auto generated set of tags to determine a match.

* * * * *